(12) United States Patent
Hughes

(10) Patent No.: US 7,550,079 B2
(45) Date of Patent: Jun. 23, 2009

(54) SYSTEM AND METHOD FOR WATER RESTORATION

(76) Inventor: Matthew Hughes, 2800 Washington, PMB-B9, Port Townsend, WA (US) 98368

( * ) Notice: Subject to any disclaimer, the term of this patent is extended or adjusted under 35 U.S.C. 154(b) by 0 days.

(21) Appl. No.: 11/678,437

(22) Filed: Feb. 23, 2007

(65) Prior Publication Data

US 2008/0185351 A1 Aug. 7, 2008

Related U.S. Application Data

(60) Provisional application No. 60/887,873, filed on Feb. 2, 2007.

(51) Int. Cl.
*E02B 15/04* (2006.01)
(52) U.S. Cl. .................. 210/170.09; 210/170.11; 210/196; 210/523; 210/540; 210/923
(58) Field of Classification Search ............. 210/747, 210/776, 167.01, 167.1, 170.09, 170.11, 210/194, 196, 242.3, 523, 540, 923
See application file for complete search history.

(56) References Cited

U.S. PATENT DOCUMENTS

| | | | | |
|---|---|---|---|---|
| 2,330,508 A | * | 9/1943 | McColl | .................... 210/242.3 |
| 3,219,189 A | * | 11/1965 | Moore | .......................... 210/540 |
| 3,263,811 A | * | 8/1966 | Baker et al. | .............. 210/167.1 |
| 3,556,301 A | | 1/1971 | Smith | |
| 3,726,406 A | * | 4/1973 | Damberger | .............. 210/242.3 |
| 3,727,766 A | | 4/1973 | Horne et al. | |
| 3,762,169 A | * | 10/1973 | Graham | ....................... 210/923 |
| 3,847,815 A | * | 11/1974 | Chastan-Bagnis | ........ 210/242.3 |
| 3,909,416 A | | 9/1975 | In't Veld | |
| 4,033,137 A | | 7/1977 | Geist | |
| 4,033,869 A | | 7/1977 | McGrew | |
| 4,052,306 A | | 10/1977 | Schwartz et al. | |
| 4,057,498 A | * | 11/1977 | Vidilles | ................. 210/170.11 |
| 4,060,487 A | | 11/1977 | Samsel | |
| 4,128,068 A | * | 12/1978 | Ogura et al. | ............. 210/242.3 |
| 4,551,244 A | | 11/1985 | Inoue | |
| 4,623,452 A | | 11/1986 | Petersen | |
| 4,640,784 A | * | 2/1987 | Cant | ........................... 210/776 |
| 5,043,065 A | | 8/1991 | Propp | |
| 5,108,600 A | * | 4/1992 | Rees et al. | ................ 210/242.3 |

(Continued)

*Primary Examiner*—Christopher Upton
(74) *Attorney, Agent, or Firm*—Black Lowe & Graham PLLC

(57) ABSTRACT

System and method for water restoration to a water pool or to water regions associated with freshwater or saltwater marinas. Embodiments include a positive water flow device that works in unison with a negative water flow device, wherein the positive and negative flow devices are separated from each other in the water pool or water regions. The positive flow device, for example, a water jet, directs a stream of water beneath the water surface of the water pool or water regions, and causes a water surface to move towards the negative flow device by a hydraulic pushing action. The negative flow device includes a water pump and receiving port, augments the hydraulic pushing action by providing a complementary pulling action by applying a vacuum or negative pressure to a water receiving port, or scoop. Water laden, oily surface contaminants are then removed in the scoop as a water oil mixture that is subsequently separated to form an oil mixture for subsequent recycling and a clean water source that is restored for delivery back into the water pool or water regions.

9 Claims, 13 Drawing Sheets

U.S. PATENT DOCUMENTS

| | | | |
|---|---|---|---|
| 5,122,283 A * | 6/1992 | Wells | 210/776 |
| 5,183,579 A * | 2/1993 | Eller | 210/776 |
| 5,338,464 A | 8/1994 | Marr | |
| 5,372,455 A | 12/1994 | Tarca | |
| 5,409,607 A | 4/1995 | Karlberg | |
| 5,423,340 A | 6/1995 | Campbell et al. | |
| 5,439,600 A * | 8/1995 | Pasoz | 210/776 |
| 5,779,392 A | 7/1998 | Mendes | |
| 5,810,512 A | 9/1998 | Kateley | |
| 5,814,234 A | 9/1998 | Bower et al. | |
| 5,863,440 A | 1/1999 | Rink et al. | |
| 5,942,128 A * | 8/1999 | Fortier | 210/776 |
| 5,948,266 A | 9/1999 | Gore et al. | |
| 6,051,140 A | 4/2000 | Perry | |
| 6,056,881 A | 5/2000 | Miller et al. | |
| 6,099,723 A | 8/2000 | Morris et al. | |
| 6,110,361 A | 8/2000 | Bower et al. | |
| 6,120,681 A | 9/2000 | Heo | |
| 6,159,361 A | 12/2000 | Lapointe | |
| 6,174,436 B1 | 1/2001 | Kim | |
| 6,344,515 B1 | 2/2002 | Parikh et al. | |
| 6,346,193 B1 | 2/2002 | Bauer | |
| 6,609,853 B1 | 8/2003 | Guilmette | |
| 6,709,587 B1 | 3/2004 | Guilmette | |
| 6,854,927 B2 | 2/2005 | Miyazaki | |
| 6,881,335 B2 | 4/2005 | Nilsen | |
| 7,112,279 B2 | 9/2006 | Salmi et al. | |
| 7,150,835 B2 | 12/2006 | Salmi et al. | |
| 2002/0018695 A1 | 2/2002 | Johnson | |
| 2002/0168230 A1 | 11/2002 | Coe et al. | |
| 2003/0062297 A1 | 4/2003 | Rosquist | |
| 2003/0111400 A1 | 6/2003 | House | |
| 2004/0057800 A1 | 3/2004 | Winters et al. | |
| 2006/0138060 A1 | 6/2006 | Salmi et al. | |
| 2006/0266694 A1 | 11/2006 | Broje | |

* cited by examiner

SYSTEM AND METHOD FOR WATER RESTORATION

RELATED APPLICATIONS

This application claims priority to and herein incorporates by reference in its entirety U.S. Provisional Patent Application Ser. No. 60/887,873 filed Feb. 2, 2007.

FIELD OF THE INVENTION

An embodiment of the invention relates generally to water restoration.

BACKGROUND OF THE INVENTION

Boats, ships, or other marine vessels transiting to or housed in slips located in freshwater or ocean water marinas oftentimes contaminate the marina water with oil, gasoline, diesel and other hydrocarbon-based wastes by virtue of vessel use, or as a result of spills and vessel deterioration. There is a need to remove hydrocarbon-based wastes and return restored marina water to its source.

SUMMARY OF THE PARTICULAR EMBODIMENTS

An embodiment of the invention includes a system and method for removing oil, gasoline, diesel and other hydrocarbon polluted water from a body of water, separating the pollutants from the polluted water to form a cleansed water volume, and returning the cleansed water volume to the body of water or to place in storage for other uses.

Other embodiments include a water movement and purification system using a positive flow source and a negative flow source to complementarily urge the motion of pollutant-laden water from the positive flow source towards the negative flow source for harvesting pollutant-laden water for subsequent removal of contaminants, for example, petroleum based substances floating on the water surface. Cleansed water volumes are then produced for return to the body of water, placed in storage reservoirs for clean water uses, or routed to the body of water via the positive flow source to advantageously rejuvenate and replace the region of water with the cleansed, restored water wherein the restored water also participates in the cleansing process of the remaining polluted portions of the body of water.

BRIEF DESCRIPTION OF THE DRAWINGS

Embodiments of the present invention are described in detail below with reference to the following drawings.

DETAILED DESCRIPTION OF THE PARTICULAR EMBODIMENTS

In general, particular embodiments include systems and/or methods to de-pollute and clean water to its restored state within a water pool or a water region associated with freshwater or saltwater marinas. Embodiments include a positive water flow device or water delivery device that works in unison with a negative water flow device or water removal device, wherein the positive and negative flow devices are separated from each other in the water pool or water regions. The positive flow device, for example, a water jet, directs a stream of water beneath the water surface of the water pool or water regions, and causes the water surface to move towards the negative flow device by a hydraulic pushing action. The negative flow device includes a water pump and receiving port or water scoop, and with its suction action, augments the hydraulic pushing action by providing a complementary pulling action through application of a vacuum or negative pressure to the water scoop that is substantially located at water level. Water laden, oily surface contaminants are then removed in the scoop as a water oil mixture that may be subsequently separated to form an oil mixture for subsequent recycling and a clean water source that may be restored for delivery back into the water pool or water regions.

Figure 1:
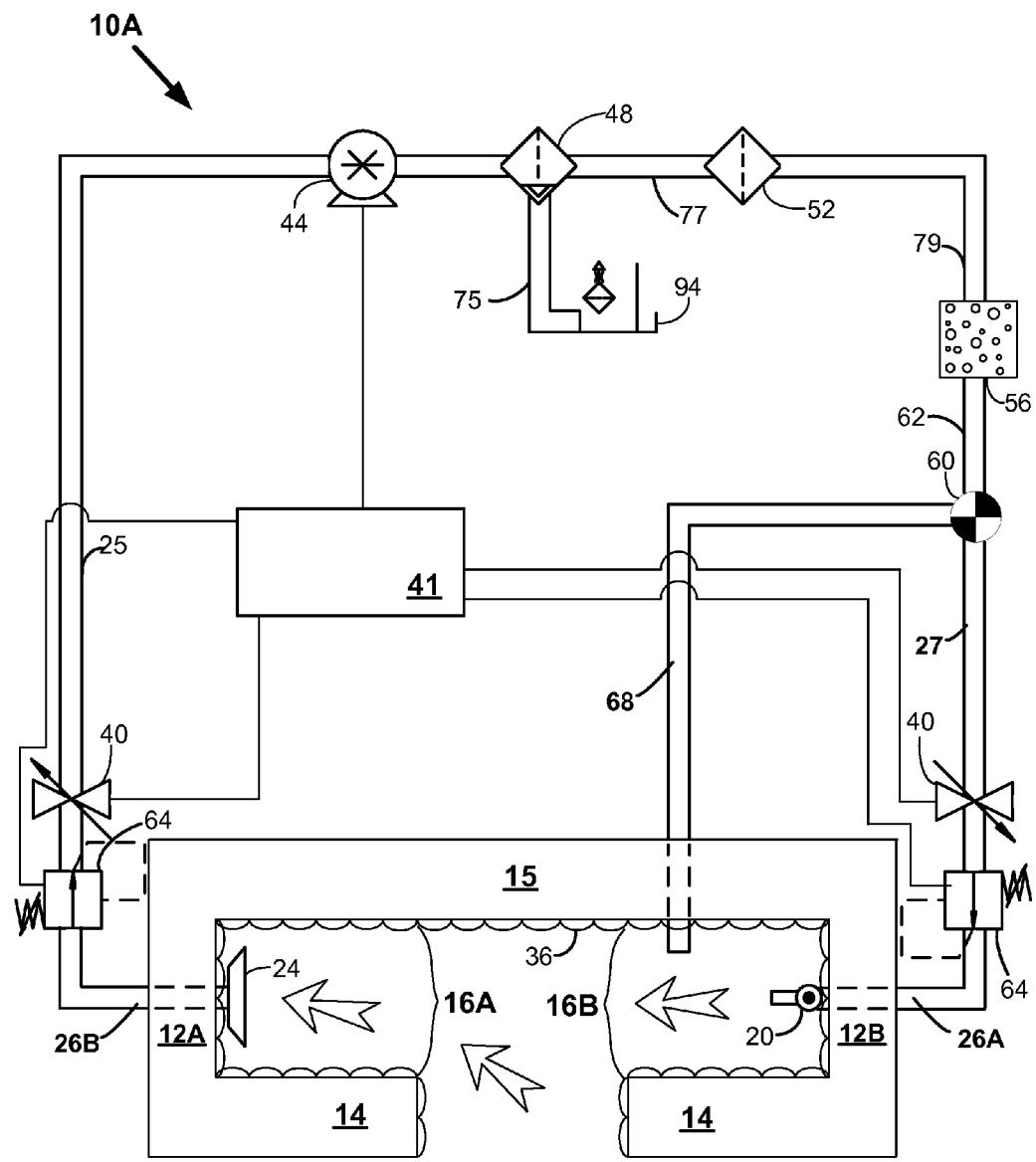
FIG. 1 schematically and pictorially illustrates a water restoration system 10A connected with an inverted U-shaped marina showing the movement of marina water from a positive flow source to a negative flow source between adjacently opposed boat slips.

FIG. 1 schematically and pictorially illustrates a water restoration system 10A connected with an inverted U-shaped, two-pier marina showing the movement of marina water from a positive flow source to a negative flow source between adjacently opposed boat slips. The inverted U-shaped marina may be substantially rectangular and configured to have a low pressure hydraulic region and a high pressure hydraulic region in which there is a coordinated movement of marina surface water from a positive flow source to a negative flow source generally in the direction of the illustrated flow arrows between two opposing boat slips. Components of the water restoration system 10A may be located on the docks of the marina and/or may extend onto shoreline properties. The system 10A includes a low pressure pier 12A, a high pressure pier 12B, from which two opposing boat docks 14 extend from to define a low pressure slip 16A located between the boat docks 14 on the low pressure pier 12A and a high pressure slip 16B located between the boat docks 14 on the high pressure pier 12B. The low and high pressure piers 12A and 12B may be slidably mounted to pilings (not shown) so that the boat docks 14 and piers 12A and 12B may float with the tide, wave action, or other causes imparted to varying marina water levels. Located between the low and high pressure piers 12A and 12B is a walking platform 15. The piers 12A and 12B may be flexibly attached to the walking platform 15 to accommodate changes in vertical distance from water level fluctuation experienced by the piers 12A and 12B.

Within the low pressure slip 16A is mounted a suction port or vacuum scoop 24. Within high pressure slips 16B is mounted a water jet 20. The water jet 20 may have a nozzle configuration to advantageously allow adjustments to the water pressure and spray patterns. The spray patterns may include columnar; fan, and laminar flow patterns. A low-pressure pipe 25 in fluid communication with the suction port 24 and removes surface water by aspirating by the suction ports 24 located on the low-pressure pier 12A. The pushing effect of water shot from water jets 20 located on the positive pressure pier 12B, preferably beneath the surface of the marina water to avoid frothing or bumping, in concert with the suction force applied from the suction ports 24, urges the marina water surface towards the suction ports 24. A high-pressure pipe 27 supplies the water delivered to the water jets 20. The low pressure pipe 25 and high-pressure pipe 27 may be made of polyvinyl chloride (PVC), other durable plastics, metal, and/or have durable and flexible sections in those regions of the system 10A where the pipes transitions from the shore side to the marina side of the system 10A to accommodate for any changes in height of the respective piers 12A and 12B due to marina water fluctuations.

Surrounding the low pressure slip 16A and high pressure slip 16B are skirts or curtains 36 that are fitted around both intake vacuum port 24, jet port 20, the space defining perimeter of the low and high pressure slips 16A and 16B, the water side of the walking platform 15, and along the ends of the docks 14. The skirt or curtain 36 serves to isolate pollutants or otherwise contain water surface bearing pollutants within the marina and prevent the leaking from the slips 16A and 16B. The skirts 36 may extend beneath the water surface or water line to contain surface riding or near surface residing pollutants. The skirt 36 provides a curtain throughout the marina to help isolate and prevent the escape under the piers 12A and 12B of at-surface and near-surface residing pollutants to optimize the delivery of directionalized surface flows to the suction port 24 for more efficient harvesting of marina polluted waters.

Referring still to FIG. 1, in hydraulic communication with the low-pressure pipe 25 and high-pressure pipe 27 are electronic control valves 40 depicted in functional schematic symbols. The electronic control valves 40 are in electrical communication with a main control panel 41. The electronic control valve 40 operates in an open-close manner and serves substantially as a diverter valve. The control valve may be plumbed between flexible piping 26 and low and high pressure pipes 25 and 27. To help adjust flow rates and measure the volume flow delivered from suction ports 24 or delivered to jets 20 are electronic pressure regulator valves 64, depicted in a functional symbol, also in electrical communication with the main control panel 41. In hydraulic communication with the low-pressure pipe 25 is a high flow fluid pump 44 which may be diesel or gasoline powered, and provides the suction force to the suction ports 24 to collect marina water and any oil pollutants. The pump 44 includes an influent channel and an effluent channel, the influent channel being in hydraulic communication with the water scoop 24 and the effluent channel in hydraulic communication with the water jet 20. The pump 44 may be in electrical communication with the electrical control panel 41, or alternatively, may be operated autonomously from the control and regulator valves 40 and 64. In alternate embodiments, the high flow pump 44 may include the Flowserve model series DVSH between bearings axially split pumps available from Flowserve, Ashland, Tex., USA or the Gould model series AF/MPAF axial flow pumps available from Gould, Ashland, Pa., USA.

Thereafter, the pollutant laden marina water may be routed to a large capacity petroleum water separator and filter 48 depicted in a functional symbol. The separator-filter 48 extracts gas, oil, and other organics from the marina water and routes it to pipe 75 for delivery to a tank 94 or other suitable receptacle for salvaging, refinement and recycling, or to be discarded as hazardous waste. The tank 94 may be vented. Recycled petroleum products may be used in the powering of the high flow pump 44. In alternate embodiments the separator-filter 48 may include the cylindrical or rectangular configured Highland Tank Models UL-2215, Series J, Series G, and/or Series EZ Access available from Highland Tank, Stoystown, Pa., USA. The separator-filter 48 then routes the cleansed marina water via pipe 79 to a chemical micro-filter 52 to remove other wastes or particulate matter. The micro-filter 52 may include clay and/or charcoal as the filtering medium. Thereafter, via pipe 79, the cleansed and filter marina water may be oxygenated in an aerator 56. The aerator 56 has sufficient flow capacity to match the incoming marina flow volumes and may be electrically powered. Thereafter, the aerated marina water may be routed through a flow diversion valve 60, which is either set for delivery to an underwater port in the marina via bypass pipe 68, or to high-pressure jets 20 via pipe 62 that is plumbed to high-pressure pipe 27. As illustrated by example, the bypass pipe 68 delivers restored marina water to the marina by routing underneath the walking platform 15 and curtain 36.

In alternate embodiments, a water turbine electric generator (not shown) may be plumbed between the pipe 62 and pier side high-pressure pipe 27 to generate electricity from the high water flow rates from pipe 62. Electricity generated may then be routed to supplement the electric power supply to operate the high pressure pump 44.

The water movement and purification system allows for regionalized adjustments within the marina so that a generalized marina-wide de-pollution process may be undertaken, or alternatively, on a de-pollution process engaged upon a sub-region or sub-zone basis. Thus, different water jets 20 and suction ports 24 may be selectively engaged to handle particularly problematic slips in cases when other slips are not sufficiently polluted.

Figure 2:
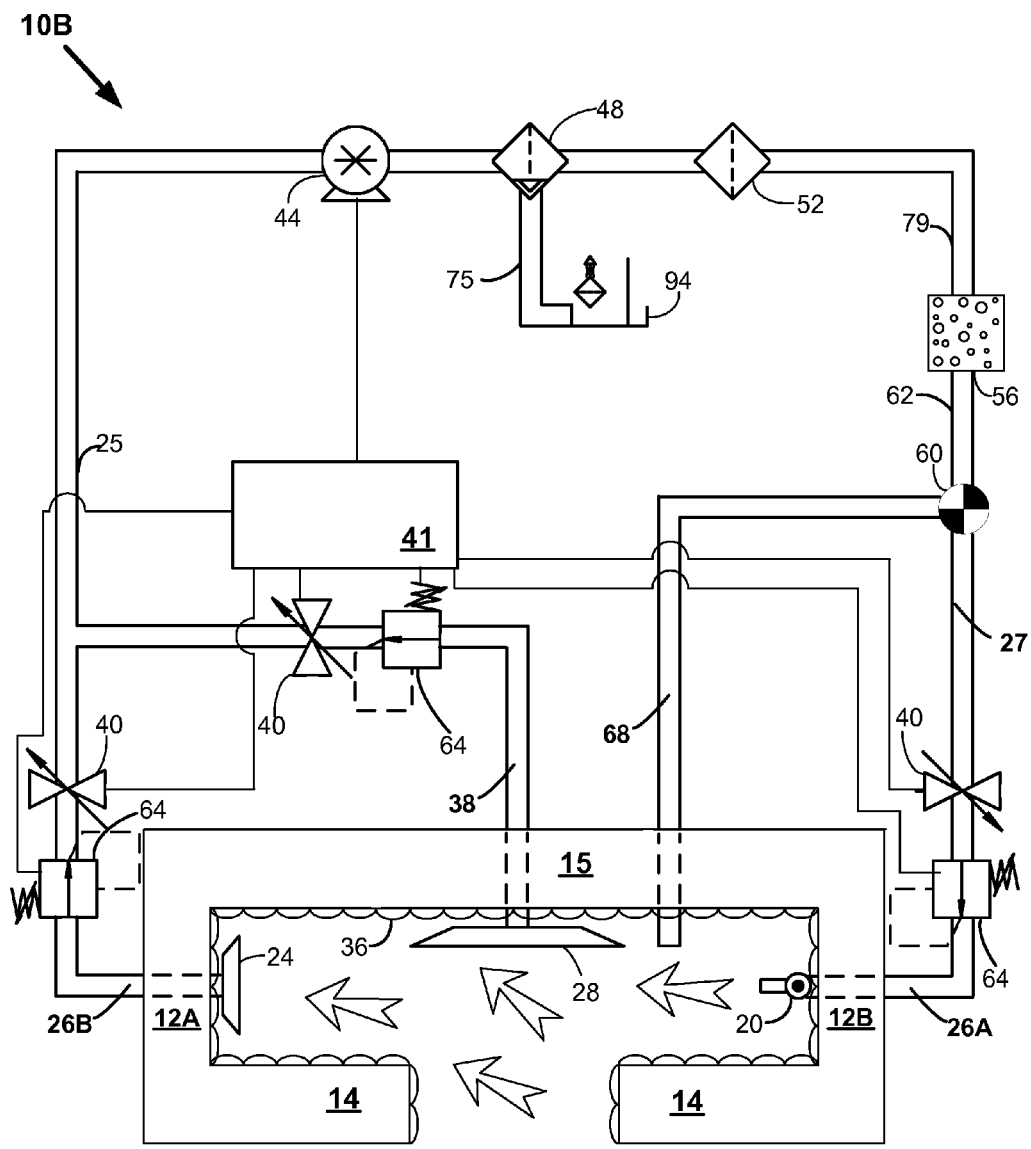
FIG. 2 schematically and pictorially illustrates an alternate embodiment of a water restoration system 10B connected with an inverted U-shaped marina showing the movement of marina water from a positive flow source to a negative flow source between adjacently opposed boat slips.

FIG. 2 schematically and pictorially illustrates an alternate embodiment of a water restoration system 10B connected with an inverted U-shaped, two-pier marina showing the movement of marina water from a positive flow source to a negative flow source between adjacently opposed boat slips. In this alternate embodiment, system 10B includes the two-pier marina being equipped with a high volume suction port 28 located near the shore end of the marina, approximately in the middle of the walking platform 15. The high volume suction port 28 further discourages the escape of marina floating oil pollutants out to open water. The shore-side located, high volume suction port 28 urges the marina water in a shore bound direction while the complimentary water jet 20 pushing and suction port 24 pulling further directs the shore bound marina surface flows to the suction ports 24 located in low-pressure slips 16A. The high volume suction port 28 may be generally perpendicular to the suction ports 24 and high velocity jet 20 and may also be opposite the marina entry port to open waters. More than one high volume suction port 28 may be installed in the marina depending on marina configuration and size. The vacuum scoops or suction ports 24 and 28 may be may be swiveled or otherwise turned to either maintain or change the intended direction of the marina water surface in concert with the water jets 20. The high volume suction port 28 is plumbed to the low-pressure pipe 25 via piping 38 as shown.

Figure 3:
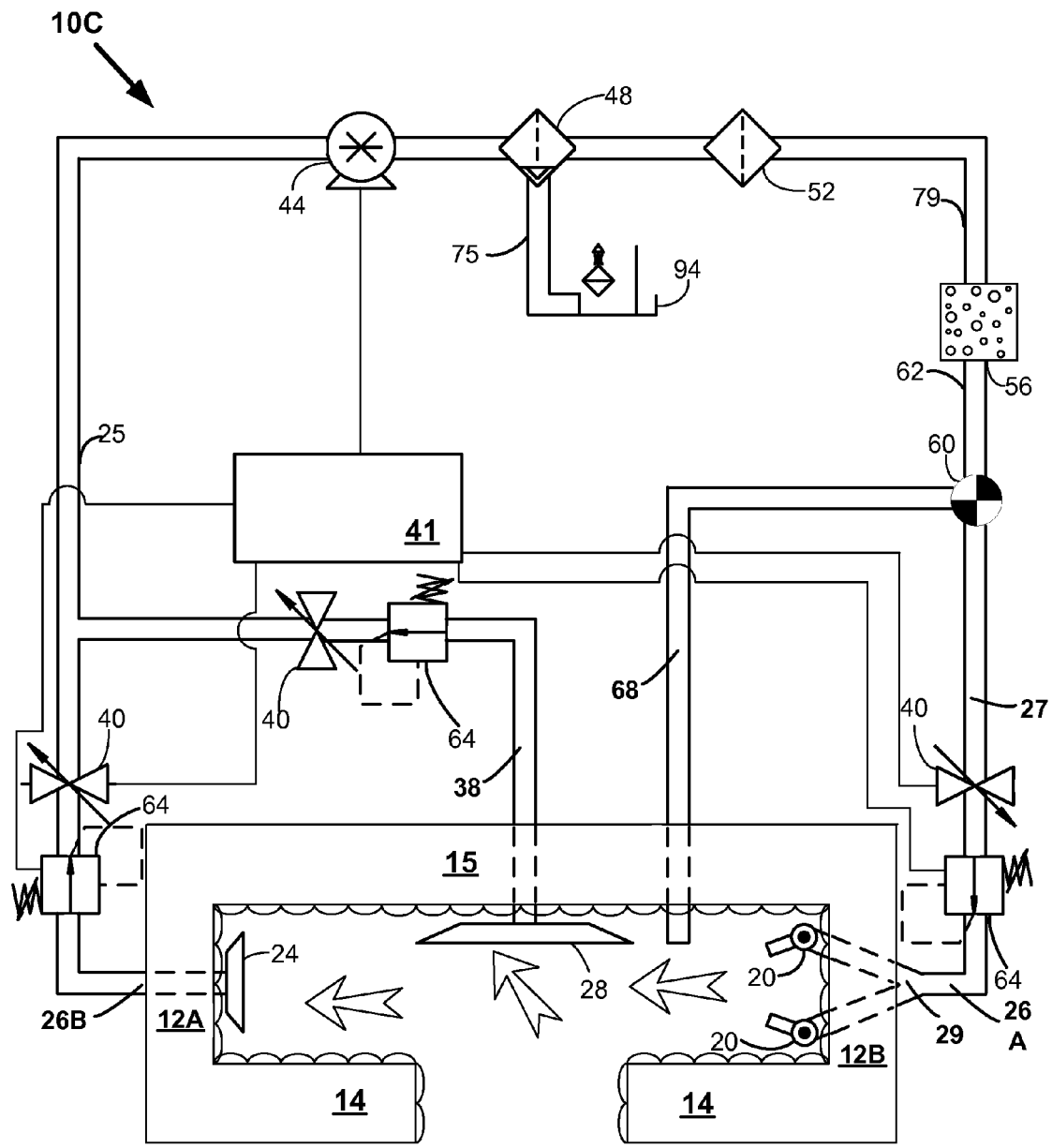
FIG. 3 schematically and pictorially illustrates an alternate embodiment of a water restoration system 10C connected with an inverted U-shaped marina showing the movement of marina water from a positive flow source to a negative flow source between adjacently opposed boat slips.

FIG. 3 schematically and pictorially illustrates an alternate embodiment of a water restoration system 10C connected with an inverted U-shaped marina showing the movement of marina water from a positive flow source to a negative flow source between adjacently opposed boat slips. Substantially similar to system 10B, system 10C adds an additional water jet 20 so that there is a pair of swivelable, and height adjustable water jets 20 within the high pressure boat slip 16B that advantageously provides for the directing or movement of water in slips occupied by boats so that water may be urged round the hull of the boats. The pair of water jets 20 is plumbed to the high pressure pipe 27 and work in concert with the water scoops 24 and 28. The high volume suction port 28 is plumbed to the low-pressure pipe 25 via piping 38 as shown. A flow splitter 29 is connected with the flexible piping 26B that in turn is hydraulically coupled with the water jets 20. The flexible tubing 26B may be comprised of wire wound spiral reinforced plastic composites of varying diameter and thickness to accommodate pressure loads and flow rates.

Figure 4:
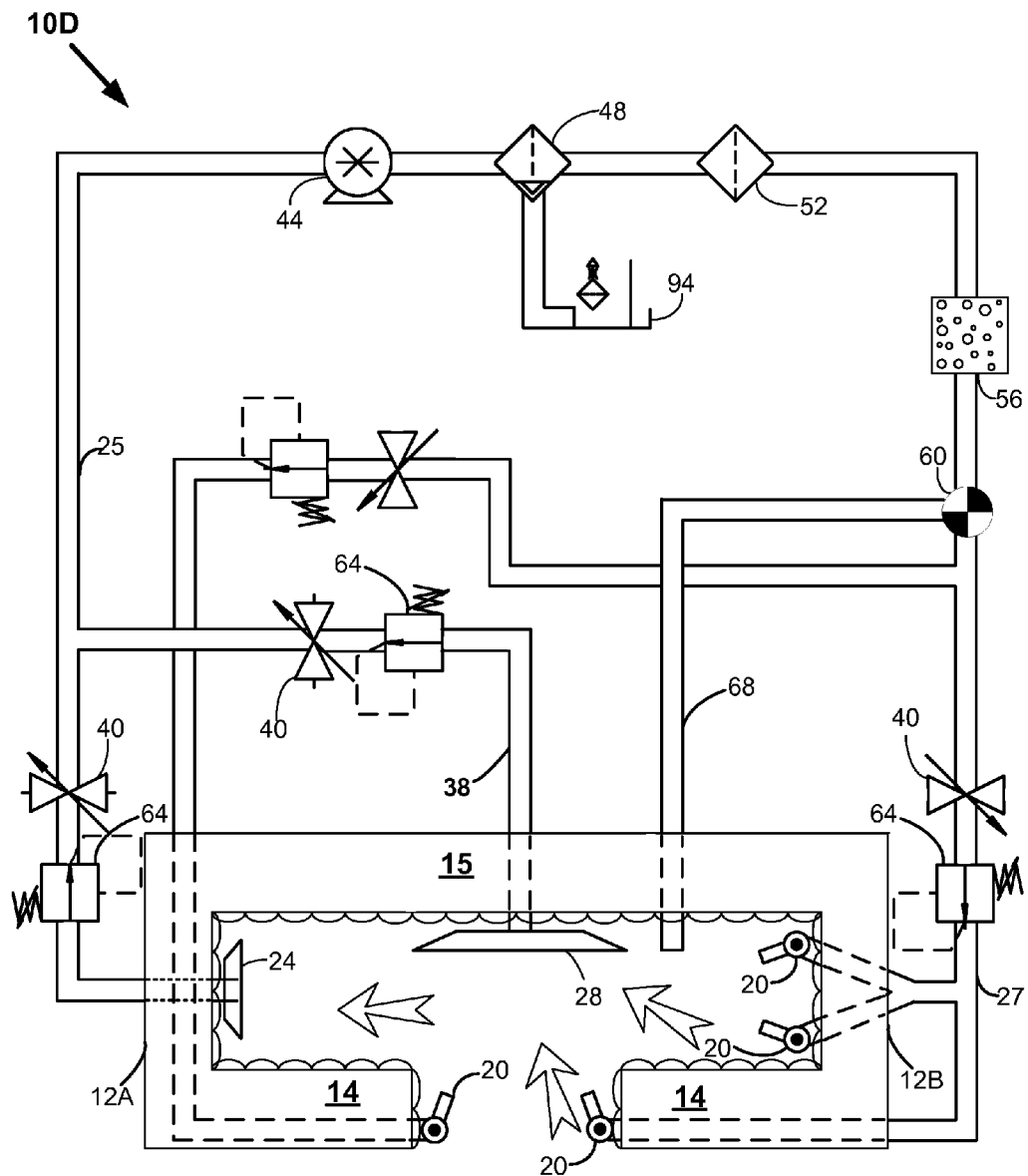
FIG. 4 schematically and pictorially illustrates an alternate embodiment of a water restoration system 10D connected with an inverted U-shaped marina showing the movement of marina water from a positive flow source to a negative flow source between adjacently opposed boat slips.

FIG. 4 schematically and pictorially illustrates an alternate embodiment of a water restoration system 10D connected with an inverted U-shaped, two-pier marina showing the movement of marina water from a positive flow source to a negative flow source between adjacently opposed boat slips. Substantially similar to system 10C, system 10D adds two additional water jets 32 located on the opposing docks 14 positioned on the marina entrance from open waters. The pair of water jets 32 is plumbed to the high pressure pipe 27 and work in concert with the water scoops 24 and 28 to further prevent the escape of polluted waters from the marina. The high volume suction port 28 is plumbed to the low-pressure pipe 25 via piping 38 as shown. The flexible tubing 26B may be comprised of wire wound spiral reinforced plastic composites of varying diameter and thickness to accommodate pressure loads and flow rates. Though not illustrated an electrical control panel 41 may be connected similarly as shown as FIGS. 1-3.

Figure 5:
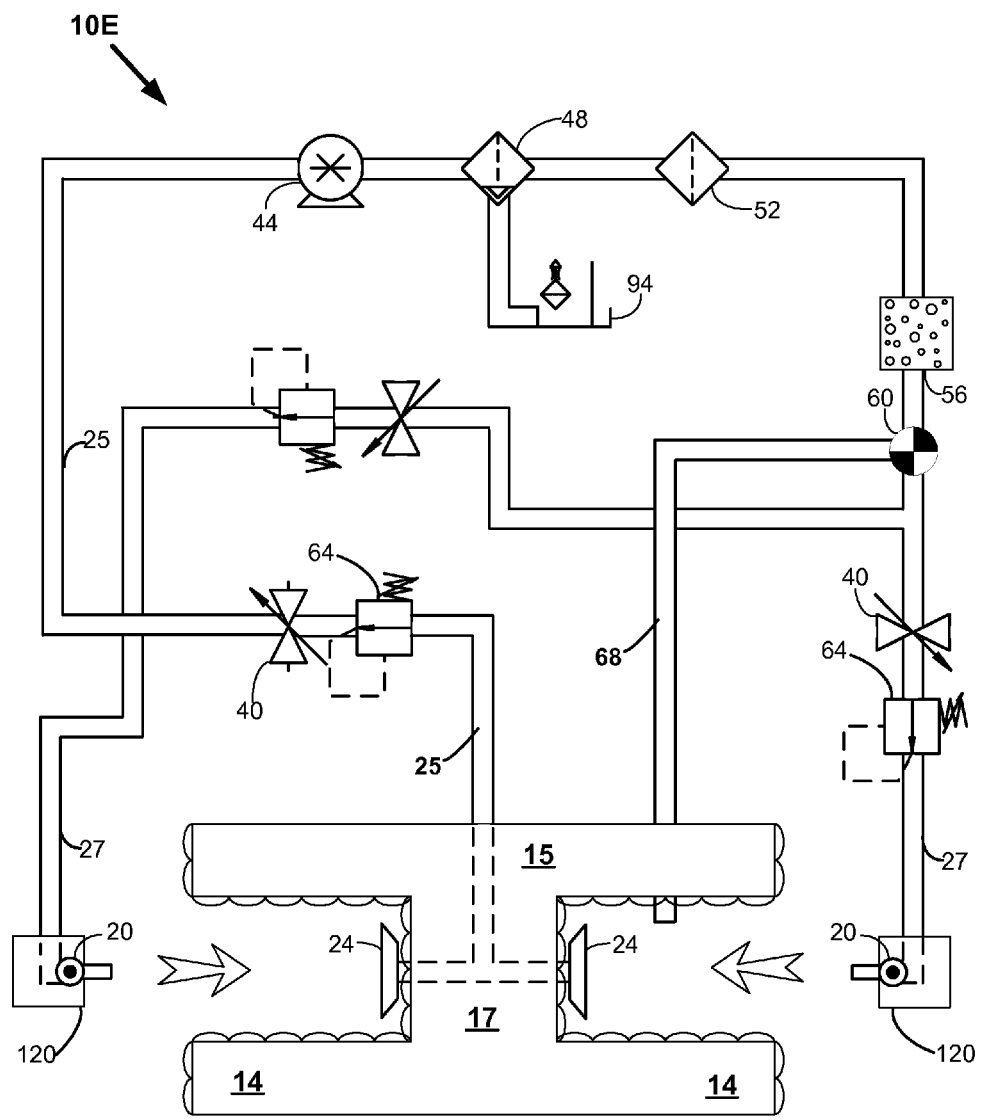
FIG. 5 schematically and pictorially illustrates an alternate embodiment of a water restoration system 10E connected with an I-shaped marina showing the movement of marina water from a positive flow source to a negative flow source between adjacently located boat slips.

FIG. 5 schematically and pictorially illustrates an alternate embodiment of a water restoration system 10E connected with an I-shaped marina showing the movement of marina water from a positive flow source to a negative flow source between adjacently located boat slips. In system 10E, the low pressure pipe 25 may be substantially located along the midline of central pier 17. The central pier 17 floats with marina water levels along pilings (not shown) and flexibly connects with the walking platform 15. On each side of pier 17 are located two adjacent boat slips, each having a vacuum scoop 24 located on the pier side of the slip and plumbed with the low pressure pipe 25. Along the perimeter of the boat slips and termini of docks 14 and walking platform 15 are curtains 36 that serve to keep the floating contaminants confined with the boat slips. Opposing each boat slip on the open water side is a float 120 to which a water jet 20 is height adjustably mounted and plumber with high pressure pipe 27 made of a durable and flexible material. Suction ports 24 cooperatively work with water flowing from water jets 20 to urge polluted water towards the suction port 24. The flexible tubing 26B may be comprised of wire wound spiral reinforced plastic composites of varying diameter and thickness to accommodate pressure loads and flow rates. Though not illustrated an electrical control panel 41 may be connected similarly as shown as FIGS. 1-3.

Figure 6:
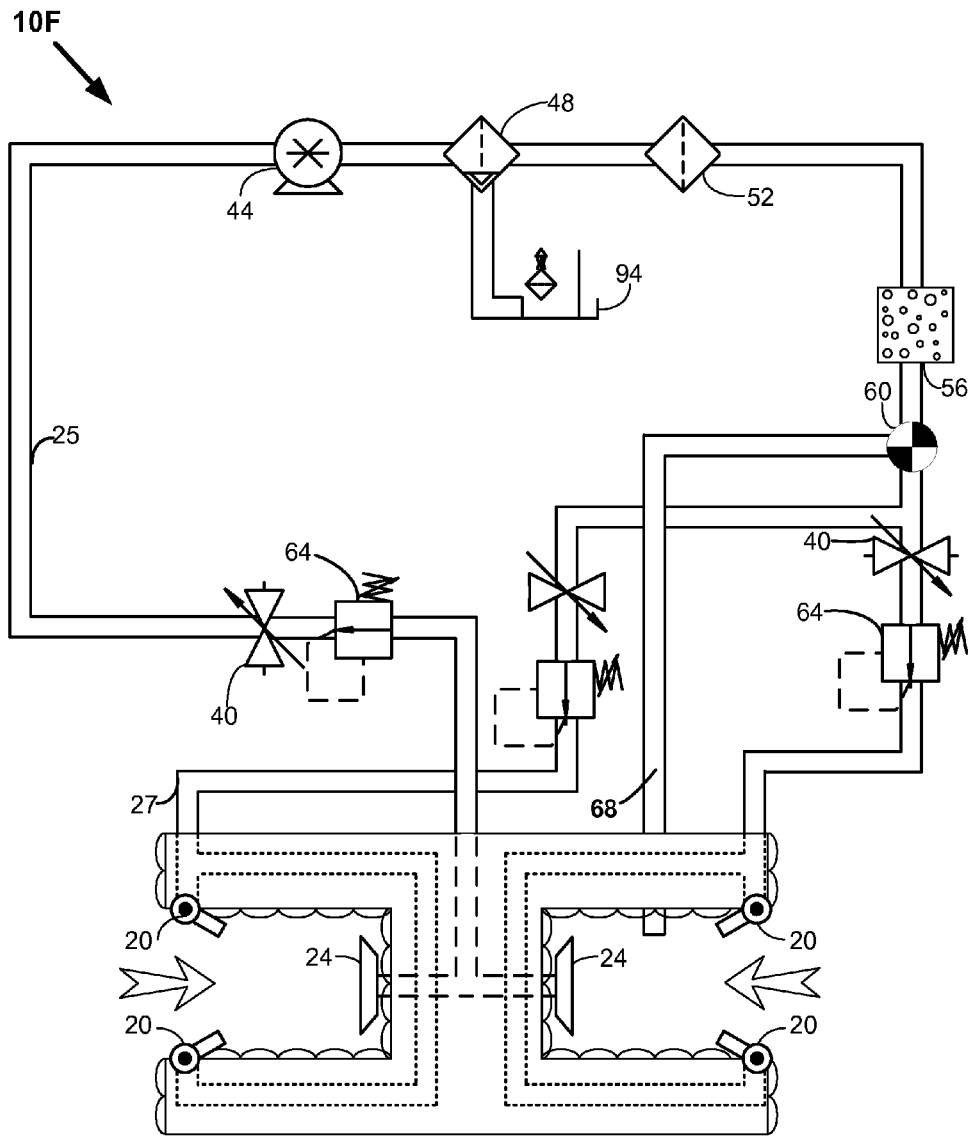
FIG. 6 schematically and pictorially illustrates an alternate embodiment of a water restoration system 10F connected with an I-shaped marina showing the movement of marina water from a positive flow source to a negative flow source between adjacently located boat slips.

FIG. 6 schematically and pictorially illustrates an alternate embodiment of a water restoration system 10F connected with an I-shaped marina showing the movement of marina water from a positive flow source to a negative flow source between adjacently located boat slips. Substantially similar to system 10E, system 10F adds replaces the float 120 and installs a pair of water jets 20 mounted from the end of the right hand dock 14 and right side terminus of walkway 15. Water from the walkway 15 and dock 14 termini aim inwardly toward the vacuum port 24. This embodiment advantageously provides for the directing or movement of water in slips occupied by boats so that water may be urged round the hull of the boats and toward the vacuum port 24. Another embodiment of system 10F may include two jets 20 installed on the float 120 aimed toward the opening of the left side boat slip to similarly route water around boat hulls toward the vacuum port 24. Though not illustrated an electrical control panel 41 may be connected similarly as shown as FIGS. 1-3.

Figure 7:
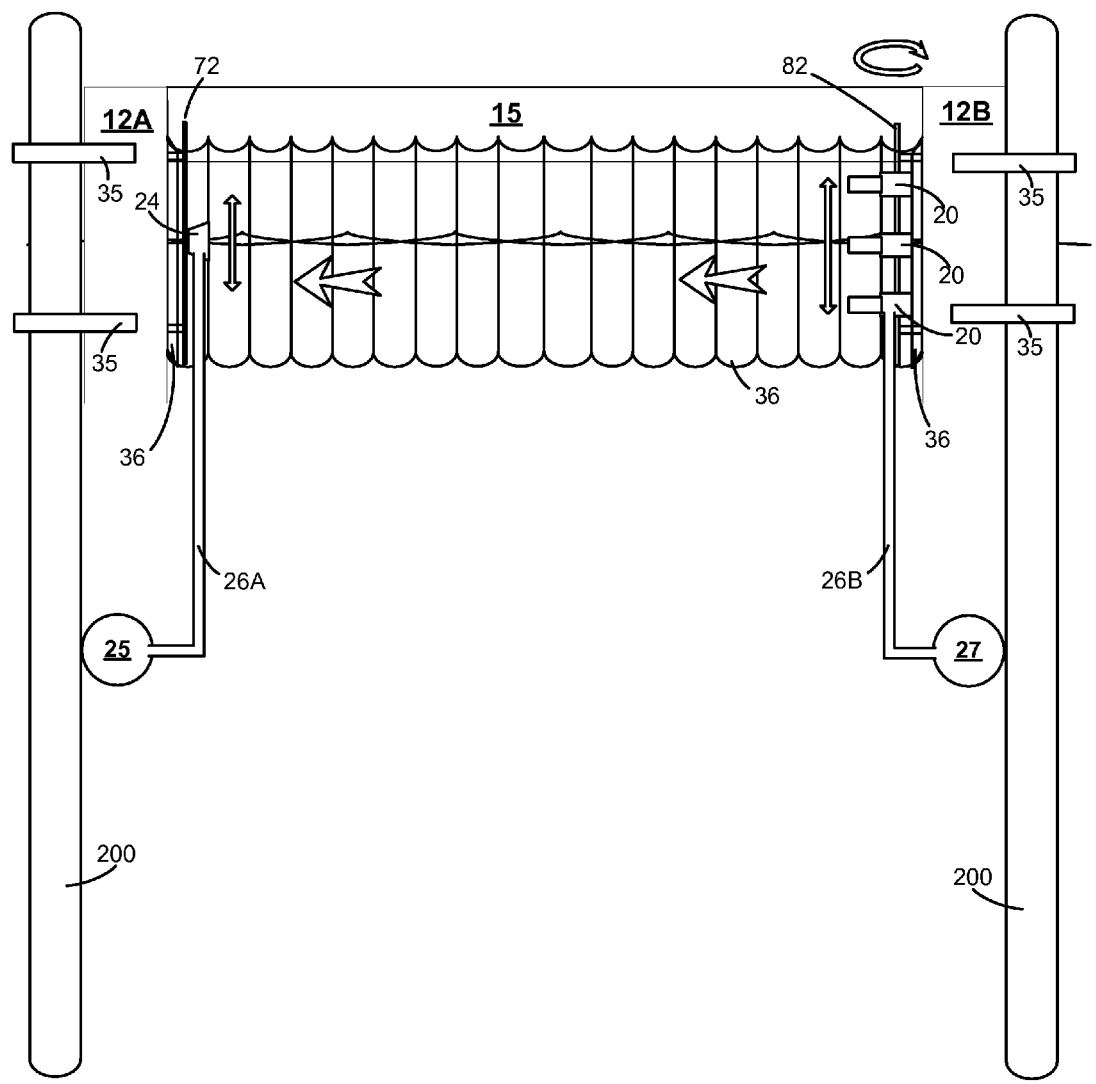
FIG. 7 is a partial cross section and side view of the opposing boat slips of the inverted U-shaped marina of FIG. 1.

FIG. 7 is a partial cross section and side view of the opposing boat slips of the inverted U-shaped marina of FIG. 1 and detail, in general, the slidable height adjustments afforded to the vacuum port 24 and water jet 20 by respective rails 72 and 82. The rail 72 may substantially U-shaped and is secured at each end against the side of the floating pier 12B through the curtain 36. Up and down vertical movement and rotational movement is available for positioning the water scoop 24 to optimally collect water surface and subsurface regions. Similarly, the rail 82 may substantially U-shaped and is secured at each end against the side of the floating pier 12A through the curtain 36. Up and down vertical movement and rotational movement is available for positioning the water jet 20 to propel the movement of surface laden pollutants towards the water scoop 24. The water jet 20 is shown deployed in three vertical height locations: 1, above the water and aiming slightly downward; 2, at water level aiming horizontal; and 3, slightly beneath the water level and aiming horizontal. In addition to the vertical height adjustments, rotational adjustments are provided for in designs described below.

Figure 8:
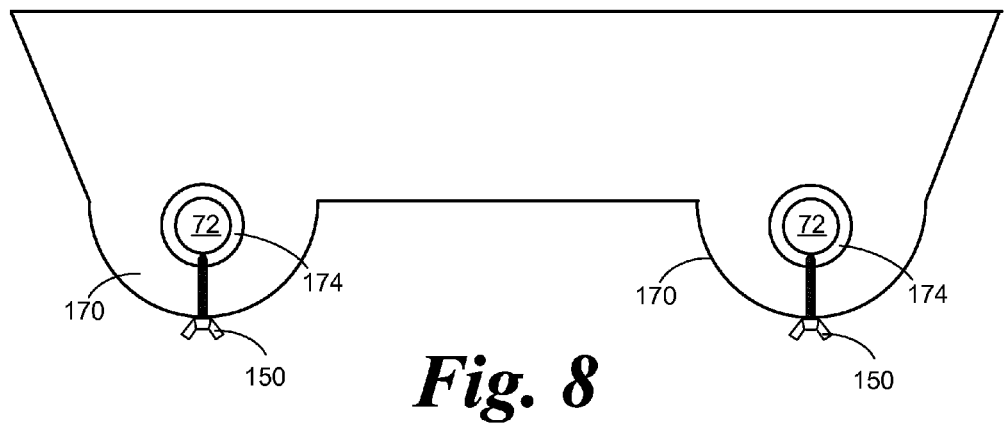
FIG. 8 is an expanded top view of the suction port 24 slidably engaged with the rails 72 of FIG. 7.

FIG. 8 is an expanded top view of the suction port or water scoop 24 slidably engaged with the rails 72 of FIG. 7. The water scoop 24 includes two flanges 170 having an orifice 174. The rail 72 may be substantially U-shaped and is secured against the side of the floating pier 12B as shown in FIG. 15 below. The rails 72 may include a straight portion that engages through an orifice 174 of flange 170 to slidably position the water scoop 24 along the rail 72 through at a desired vertical height in relation to the water surface. Engagement of the two flanges 170 with the two rails 72 primarily limits the movement of the water scoop 24 to an up and down vertical direction. The water scoop holder 24 is positioned to a desired vertical height along the rails 72 in relation to the water level and then secured to the desired vertical height by clamp screws 150. Clamp screws 150 are threaded and engage with complimentary threads (not shown) in a threaded channel (not shown) that allows transiting of the shaft part of the clamp screw 150 to firmly pinch crab against the rail 72. The two-flange arrangement may also be employed in the high volume water scoop 28 located midway between boat slips along walkway 15 of FIGS. 2-4 above and FIG. 14 below.

Figure 9:
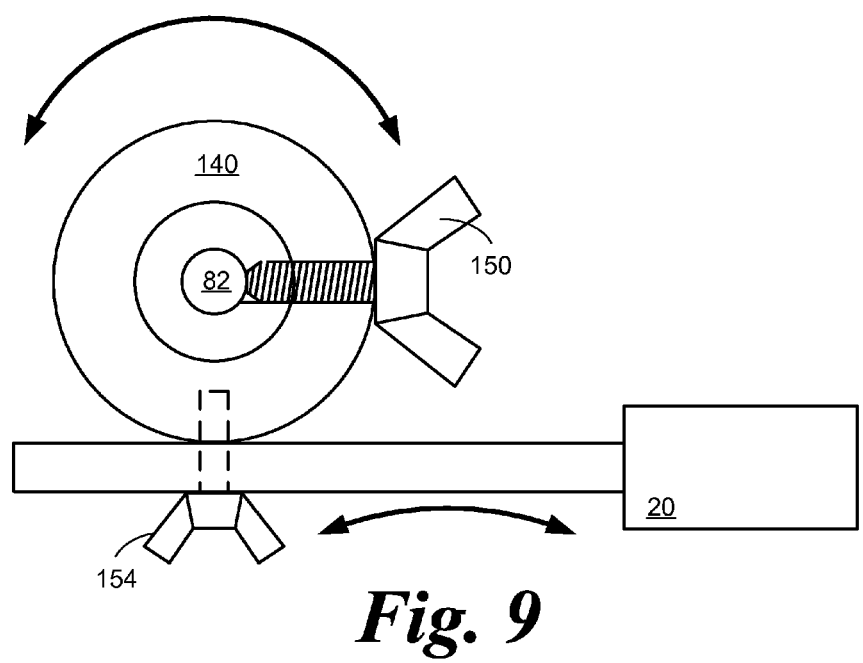
FIG. 9 is an expanded top view of the water jet 20 slidably engaged with the rail 82 of FIG. 7.

FIG. 9 is an expanded top view of the water jet 20 slidably engaged with the rail 82 of FIG. 7 using clamps to provide rotation and tilt movement. Securing of a user-selected vertical movement of the water jet 20 along the linear portion of rail 82 is provided by the clamp screw 150 to firmly pinch crab against the rail 82. Tilt movement about the water jet holder 140 is provided by tilt clamping screw 154.

Figure 10:
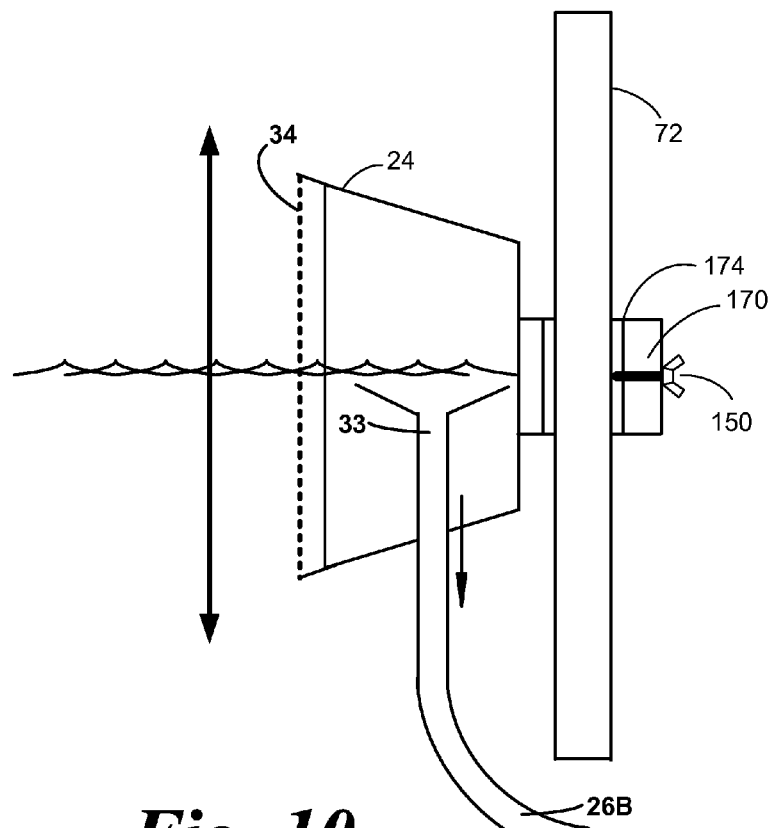
FIG. 10 is an expanded side view of an alternate embodiment of the suction port 24 slidably engaged with the rails 72 of FIG. 7.

FIG. 10 is an expanded side view of an alternate embodiment of the water scoop 24 slidably engaged with the rails 72 of FIG. 7. Placed in front of the opening to the water scoop 24 is a coarse screen 34 to strain large floating debris, for example, wood fragments and disposable bottles from entering into a water funnel 33 that is in hydraulic communication with the flexible piping 26B. The scoop 24 is shown adjusted at water surface level by the clamp screw 150 that firmly pinch crabs against the rail 72 though flange 170. The water funnel 33 is shown beneath the water level to suck in water surface bearing pollutants under the negative pressure influence of pump 44.

Figure 11:
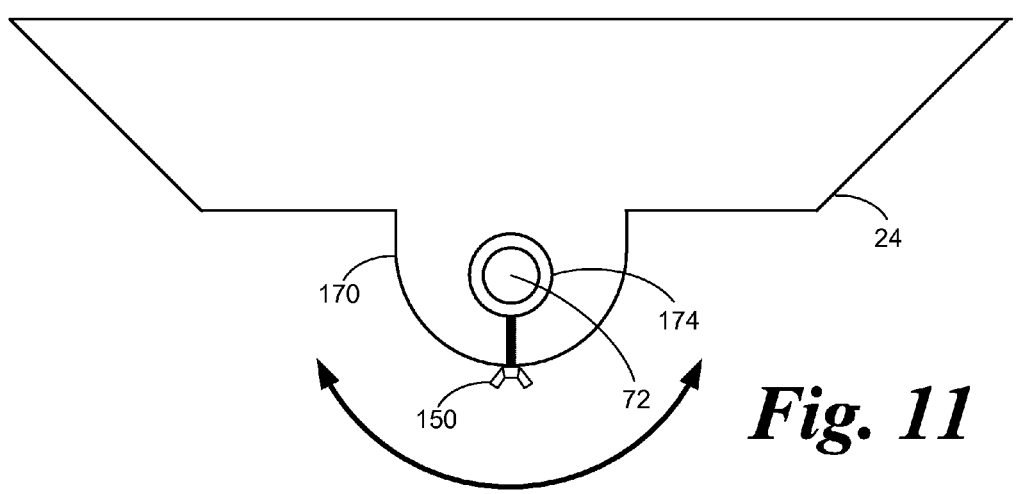
FIG. 11 is an expanded top view of an alternate, pivotable embodiment of the suction port 24 slidably engaged with the rails 72 of FIG. 7.

FIG. 11 is an expanded top view of an alternate, pivotable embodiment of the suction port 24 slidably engaged with the rail 72 of FIG. 7. The boat slips depicted in FIGS. 1-6 may be equipped with a single rail 72. In additional to vertical movement, the scoop 24 in this alternate embodiment gains rotational movement through a centrally located flange 170 in a plane substantially perpendicular to the axis of the single rail 72. After adjusting the rotational position of the suction port 24, both the vertical height and rotational angle of the suction port 24 is secured through the pinching action of clamp bolt 150 against the rail 72.

Figure 12:
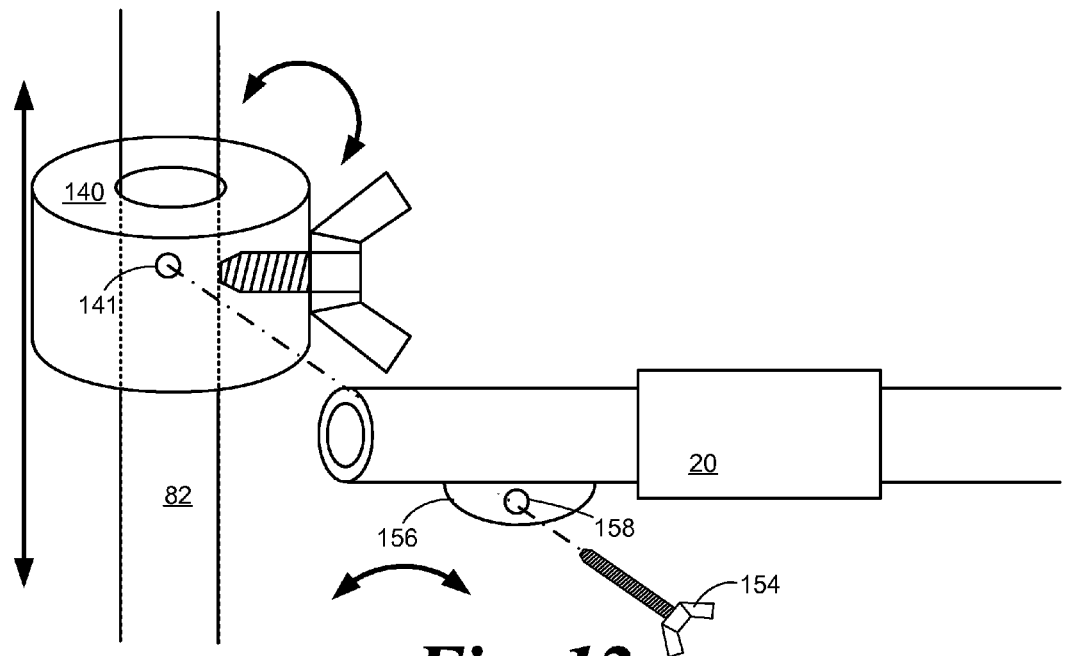
FIG. 12 is an expanded side perspective view of the water jets 20 and 32 slidably engaged with the rail 82 via jet nozzle holder 140 assembly providing a vertical, rotation, and tilt movements.

FIG. 12 is an expanded side perspective view of the water jets 20 and 32 slidably engaged with the rail 82 via jet nozzle holder 140 assembly providing a vertical, rotation, and tilt movements. The nozzle holder 140 details the tilt adjustments afforded to the water jet nozzles 20 and/or 32. Attached to the jet nozzles 20 or 32 is a flange 156 having a flange orifice 158. The flange 156 fits against the side of the nozzle holder 140 to align the flange orifice 158 with a nozzle orifice 141. The depth of the nozzle orifice 141 need not pass through to the rail 82. The tilt-securing clamp 154 is passed through flange orifice 158 and thence to the nozzle orifice 141 for threaded engagement, and subsequently tightened until the desired tilt angle to the nozzle of water jets 20 and/or 32 is secured.

Figure 13:
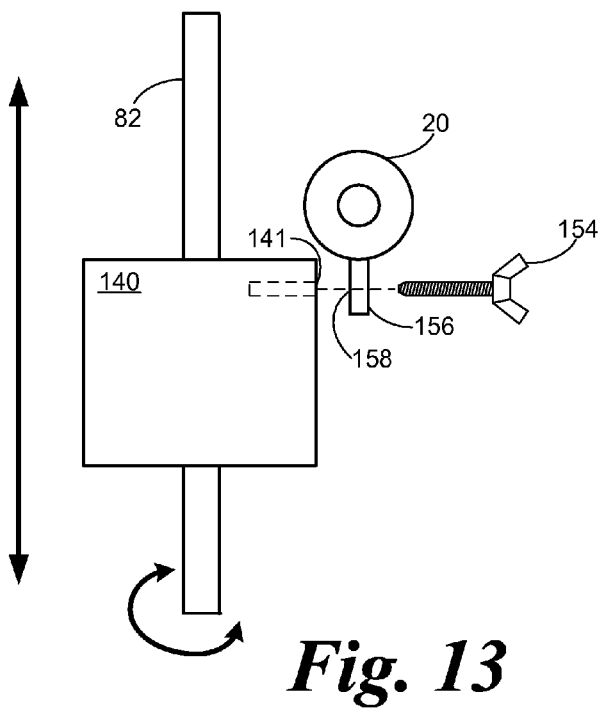
FIG. 13 is an expanded side view of the water jet 20 slidably engaged with the rail 82 of FIG. 12.

FIG. 13 is an expanded side view of the water jet 20 slidably engaged with the rail 82 of FIG. 12. The tilt-securing clamp 154 is passed through flange orifice 158 and thence to the nozzle orifice 141 for threaded engagement, and subsequently tightened until the desired tilt angle to the nozzle of water jets 20 and/or 32 is secured.

Figure 14:
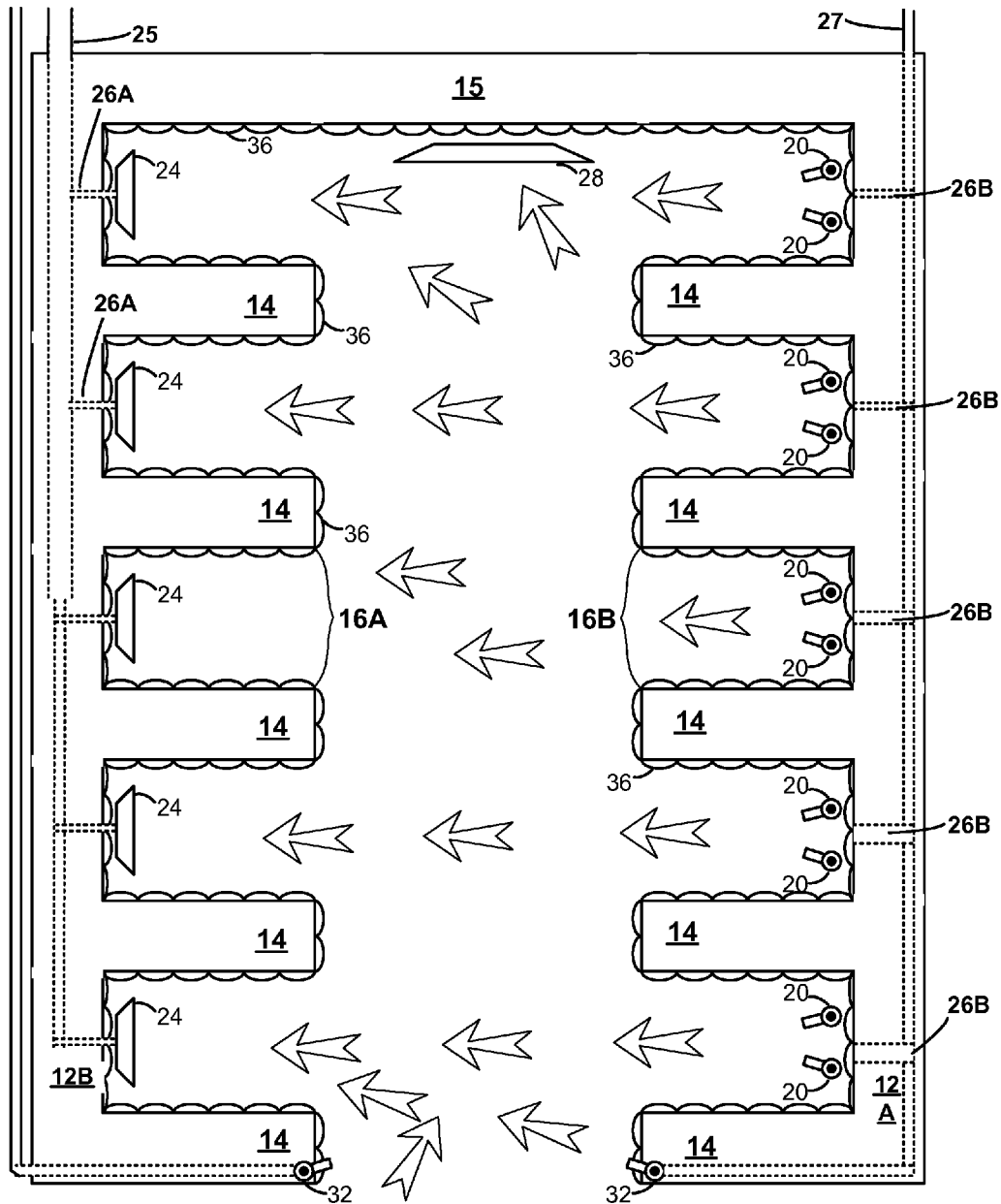
FIG. 14 schematically illustrates a multi-slip marina 100 that is an expansion of the inverted U-shaped two-slip marina of FIG. 4.
Figure 15:
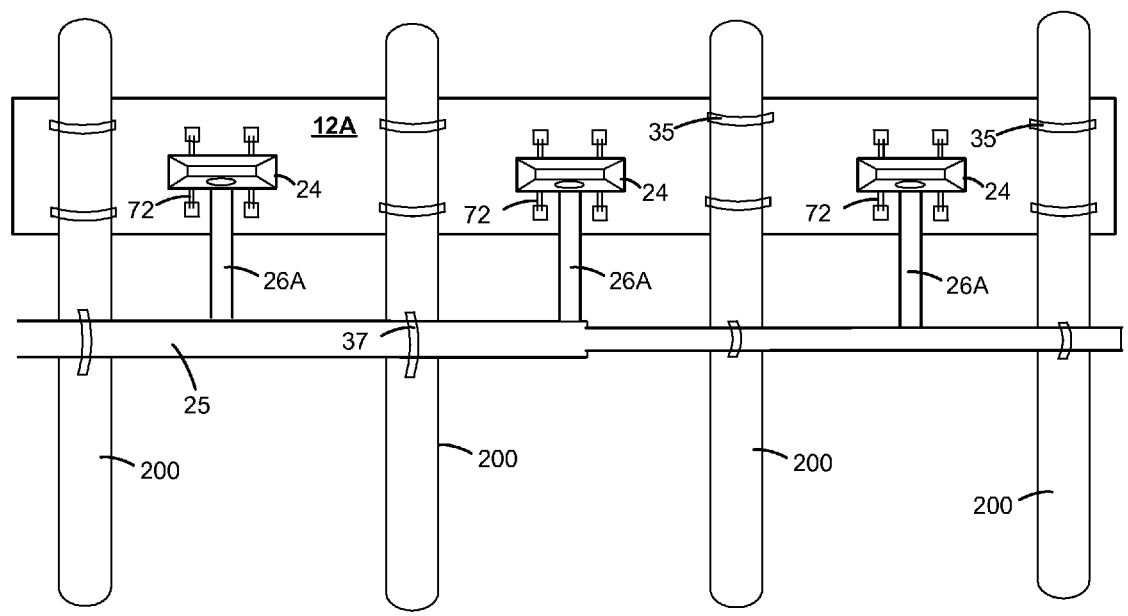
FIG. 15 schematically and pictorially illustrates the plumbing configuration of the marina negative flow sources of water restoration system 100 of FIG. 14.

FIG. 14 schematically illustrates a multi-slip marina 100 that is an expansion of the inverted U-shaped two-slip marina of FIG. 4. FIG. 11 schematically illustrates a multi-slip marina 100 that is an expansion of the inverted U-shaped two-slip marina of FIG. 4. The marina 100 includes the low pressure pier 12A, the high pressure pier 12B, from which a plurality of boat docks 14 extend from to define five low pressure slips 16A located between the boat docks 14 on the low pressure pier 12A and five high pressure slips 16B located between the boat docks 14 on the high pressure pier 12B. The marina 100 may include multiples and submultiples of the low and high pressure boat slips 16A and 16B. Within the low pressure slips 16A is mounted the suction port or vacuum scoop 24. Within the high pressure slips 16B is mounted at least one water jet 20, here illustrated as a pair. The low-pressure pipe 25 is in fluid communication with the suction ports 24 and removes surface water aspirated by the suction ports 24 located on the low-pressure pier 12A. The low pressure pipe 25 may be made of polyvinyl chloride (PVC), other durable and flexible plastics chemically resistant to organic fluids, or metal. The pushing effect of water shot from water jets 20 located on the positive pressure pier 12B, preferably beneath the surface of the marina water to avoid frothing or bumping, in concert with the suction force applied from the suction ports 24, urges the marina water surface towards the suction ports 24. The high-pressure pipe 27 supplies the water delivered to the water jets 20. The high-pressure pipe 27 may be made of polyvinyl chloride (PVC), other durable and flexible plastics, or metal. Surrounding the low pressure slips 16A and high pressure slips 16B are skirts 36 that are fitted around both intake vacuum ports 24 and jet ports 20 to isolate or contain pollutants within the boat slips 16A or 16B so as not to escape underneath the piers 12A and 12B and thence from the marina. The skirts 36 may extend beneath the water surface or water line to contain surface riding or near surface residing pollutants. The skirt 36 provides a curtain throughout the marina to help isolate and prevent the escape under the piers 12A and 12B of at-surface and near-surface residing pollutants to optimize the delivery of directionalized surface flows to the suction port 24 for more efficient harvesting of marina polluted waters.

Greeting the open water entering the marina are constant velocity high volume water jets 32 to significantly prevent the escape of directionalized moving surface water to the open sea from the marina at the end of the terminal or open water located docks 14 extending from the low and high pressure piers 12A and 12B. Marina entrance located water jets 32 help isolate sub-areas of the marina water surface to prevent cross contamination to open water beyond the marina entrance. The water jets 32 may have higher flow rates than slip-mounted jets 20. The water jets 20 and 32 may be swiveled or otherwise rotated to either maintain or change the intended directional flows of the marina water surface towards suction ports 24 located in low-pressure slips 16A. Alternate embodiments include the marina being equipped with a high volume suction port 28 located near the shore end of the marina to further discourage the escape of marina floating oil pollutants out to open water. The shore-side located, high volume suction port 28 urges the marina water in a shore bound direction while the complimentary water jet 20 pushing and suction port 24 pulling further directs the shore bound marina surface flows to the suction ports 24 located in low-pressure slips 16A. The high volume suction port 28 may be generally perpendicular to the suction ports 24 and high velocity jets 20 and may also be opposite the marina entry port to open waters. More than one high volume suction port 28 may be installed in the marina depending on marina configuration and size. The vacuum scoops or suction ports 24 and 28 may be may be swiveled or otherwise turned to either maintain or change the intended direction of the marina water surface in concert with the water jets 20 and 32. The diameter of the flexible piping 26B may progressively increase the further the water jets 20 are from the effluent side of the pump 44. Similarly, the diameter of the low pressure pipe 25 may progressively decrease the further the water scoops 24 are from the influent side of the pump 44.

FIG. 15 schematically and pictorially illustrates in side view the plumbing configuration of the marina negative flow sources of water restoration system 100 of FIG. 14. The scoop configuration of suction ports 24 are shown attached with the low pressure pier 12A in the low-pressure slips 16A are shown plumbed to low-pressure pipe 25 via flexible piping 26A. As the pier 12A rises and falls within the tide in the marina or due to other causes such as wave action, flooding and drought about the pilings 200 within the bands 35, the flexible piping 26A accommodates the change in vertical distance experienced by the low-pressure pier 12A. The low-pressure pipe 25 may be reduced in diameter near the more extended regions of the marina to accommodate and adjust flow suction forces to the more distally located suction ports 24 from the influent side of pump 44 so that flow suction rates in slips between shore side and open water side are substantially equalized. The low-pressure pipe may be secured directly to the pilings 200 via brackets 37, or alternatively, underneath the low-pressure pier 12A with flexible connectors to maintain hydraulic communication with the influent side of pump 44 due to variations in float height experienced by the low-pressure pier 12A.

Figure 16:
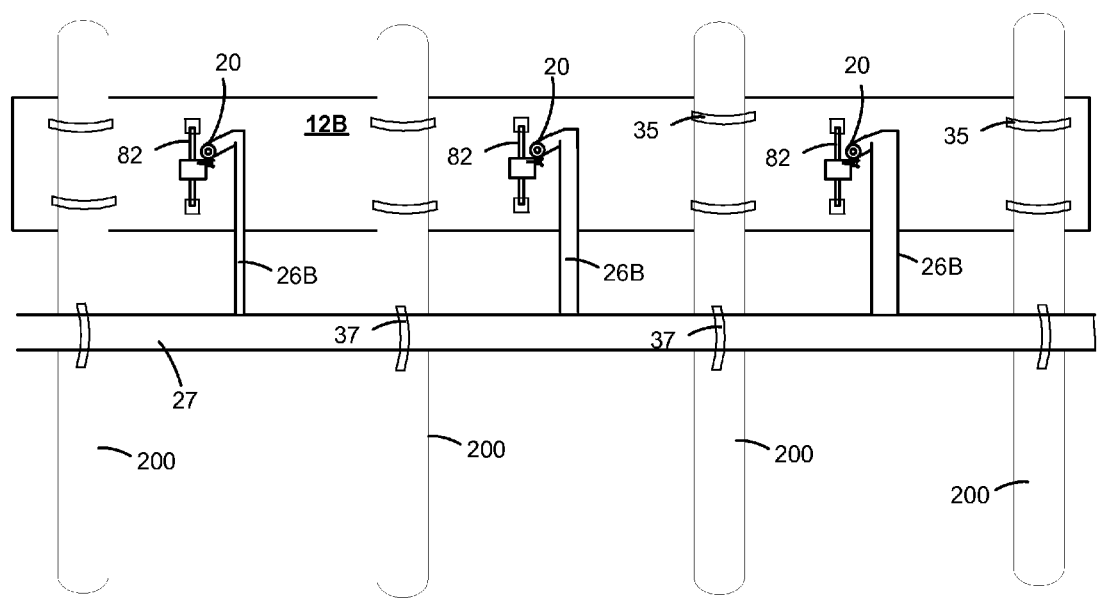
FIG. 16 schematically and pictorially illustrates the plumbing configuration of the marina positive flow sources of water restoration system 100 of FIG. 14.

FIG. 16 schematically and pictorially illustrates in side view the plumbing configuration of the marina positive flow sources of water restoration system 100 of FIG. 14. The scoop configuration of water jets 20 are shown attached with the high pressure pier 12B in the low-pressure slips 16B are shown plumbed high-pressure pipe 27 via flexible piping 26B. As the pier 12B rises and falls within the tide in the marina or due to other causes such as wave action, flooding and drought about the pilings 200 within the bands 35, the flexible piping 26B accommodates the change in vertical distance experienced by the high-pressure pier 12B. Attached or otherwise mounted to the high-pressure pier 12B is the rail 82 to which are slidably coupled the high flow jets 20. As illustrated, a single flow jet 20 is slidably and pivotably mountable to a single rail 82. The rail 82 is sufficiently long enough to permit above water jet spraying, at the water surface jet spraying, and, in a particular embodiment below the water surface jet spraying from the high flow jets 20 as shown in FIG. 7. A similar mounting arrangement for rail 82 is configured for the terminal or open water located docks 14 extending from the low-pressure pier 12A and high-pressure pier 12B for the marina entrance water jets 32. The marina entrance water jets 32 may be similarly adjusted for above surface, at surface and below surface water jetting. Alternate embodiments for underwater jetting by jets 20 and 32 may include depths ranging from just below the water surface to approximately eight inches. Pivotable attachments similar to that illustrated in FIG. 7 allow the jets 20 and 32 to be rotatable above, on, and beneath the water surface within the sliding distances conferred by the rails 82.

The water jets 20 within high-pressure slips 16B and water jets 32 mounted near the ends of docks 14 are plumbed to the high pressure pipe 27 via piping flow splitter 29 and flexible piping 26B when a pair of water jets 20 are deployed in the high-pressure boat slips illustrated in FIG. 14. The diameter of the flexible piping 26B may be progressively enlarged from the shore-side slips 16B to the open waterside slips 16B to equalize water flow rates from the water jets 20. Alternatively, flow constrictors having sufficiently increasing diameters may be mounted within the high-pressure pipe 27 in a shore-to-open water direction allowing the flexible piping 26B to have approximately the same diameter for each slip along the high-pressure pier 12B. The flexible piping 26B may be comprised of wire wound spiral reinforced plastic composites of varying diameter and thickness to accommodate pressure loads and flow rates. For example, as illustrated, the diameter of the flexible piping 26B progressively increases the further the water jets 20 are from the effluent side of the pump 44. The high-pressure pipe 27 may be secured directly to the pilings 200 via brackets 37, or alternatively, underneath the high-pressure pier 12B with flexible connectors to maintain hydraulic communication with the effluent side of pump 44 due to variations in float height experienced by the low-pressure pier 12B.

The water movement and purifications systems described may also be adapted to single pier marinas in which boat slips on each side of the pier are configured as low pressure boat slips 16A, mounted with suction ports 24, and enveloped with a curtain 36. The high pressure flow source 20B could be provided on a movable platform or boat to which at least one jet 20 is mounted, a skirt 36 extension stretched to each side of the dock 14, and plumbed with flexible hoses sufficient to withstand and deliver the operational pressures optionally advantageous for generating a high-pressure region to low pressure region surface flow direction. In such a single pier configured system, the floating platform may migrate on a slip-by-slip basis to sequentially remove slip-residing pollutants along the one and/or both sides of the single pier.

While the particular embodiments have been illustrated and described removing polluted water and returning pollutant removed or restored water to the water pools or the water regions of substantially rectangular configured marinas, other embodiments are possible. For example, the systems and methods described may be similarly applied to an array of substantially rectangular marinas, or a circular marina, or arrays thereof. Moreover, the positive and negative flow sources may be adapted for individual boat slips where the directionalized delivery of surface water may be created within a slip. Other embodiments allow for the adaptation of the positive and negative flow systems to open water scenarios in which oil spills or other surface floating contaminates are cordoned off or otherwise contained within an enveloped vicinity in which spill isolation float barriers are used as the enveloping barrier. A negative flow source is established on a polluting boat, a positive flow source is adapted on mounted to a satellite boat, flexible plumbing is used to hydraulically couple low pressure and high pressure pumps between the boats, and negative an positive flow ports similar to the suction port 24 and flow jets 20 are placed in the enveloped vicinity as a distance from each other to cooperatively establish a substantially unidirectional flow towards the suction port 24. The satellite boat and the polluting boat work in concert to urge the migration of the contained oil spill toward the polluting boat that subsequently harvests the sea water oil, removes it, and delivers the restored ocean water to the open sea. Conversely, the satellite boat houses the negative flow source and the polluting boat houses the positive flow source, and both cooperatively interact to urge the movement of open surface water contained within the spill isolation float barriers to the satellite boat for oil removal and redelivery of cleansed ocean water to the open sea. Yet other embodiments for an open water, for example, lake or open sea, water restoration system could be applied for a single boat in which the ship is enveloped by a floating spill isolation barrier and the respective low pressure and high pressure water flow devices are respectively located on the bow and stern, or portside and starboard sides of the boat, or any combination thereof or in-between that places a distance between the suction and positive flow sources to advantageously causes the net migration of polluted waters to the suction port within the enveloped vicinity. In open waters, other embodiments for providing a powerful positive flow source could be provided by an outward flow of a Jet Ski, or other powered boat craft positioned within the enveloped vicinity in which the Jet Ski is prevented from forward motion. The Jet Ski's outward flow pushes the polluted surface waters towards the negative suction port. Onboard water restoration systems in this Jet Ski embodiment would route the cleansed water back directly to the open sea. Instead, embodiments of the invention should be determined entirely by reference to the claims that follow.

The embodiments of the invention in which an exclusive property or privilege is claimed are defined as follows:

1. A system for removing pollutants from a marina comprising:
    a water removal device positioned in a first boat slip;
    a water delivery device positioned in a second boat slip, the second boat slip opposing the first boat slip and separated by a region of water between the entrance of the first and second boat slips;
    a curtain lining the perimeter of the first and second boat slips, the curtain extending above and below the surface of the water within the boat slips;
    a water restoration system including:
        a pump having an influent channel and an effluent channel, the influent channel in hydraulic communication with the water removal device and the effluent channel in hydraulic communication with the water delivery device;
        an oil water separator in hydraulic communication between the effluent channel and the water delivery device configured to remove oil from the influent water to produce a cleansed water for routing to the water delivery device,
    wherein the water removal and delivery devices complementary operate to urge the flow of surface water, within the confines of the curtain, from the second boat slip, across the region of water between the first and second boat slips, into the first boat slip and thence to the water restoration system.

2. The system of claim 1, wherein the water restoration system includes a filtration device interposed between the oil water separator and the water delivery device.

3. The system of claim 2, wherein the water restoration system includes an aerator interposed between the filtration device and the water delivery device.

4. The system of claim 3, wherein the water restoration system includes a diverter valve interposed between the aerator and the water delivery device, the diverter valve connected with the water delivery device and a bypass pipe in hydraulic communication with the marina, so that the cleansed water received by the diverter valve may be routed back to the marina through the water delivery device or the bypass pipe.

5. The system of claim 4, wherein the water restoration system includes an hydraulic generator interposed between the aerator and the water delivery device for producing electricity.

6. The system of claim 4, wherein the diverter valve delivers the cleansed water through the channel to the marina.

7. A system for removing pollutants from a boat slip in a marina, the boat slip defined by a pier and at least one dock, the system comprising:
    a water removal device positioned near the pier side of a boat slip;
    a water delivery device positioned near the terminus of the dock and aiming towards the water removal device;
    a curtain lining the perimeter of the boat slip, the curtain extending above and below the surface of the water to form a curtain perimeter and restrain the pollutants within the curtain perimeter;
    a water restoration system including:
        a pump having an influent channel and an effluent channel, the influent channel in hydraulic communication with the water removal device and the effluent channel in hydraulic communication with the water delivery device;
        an oil water separator in hydraulic communication between the effluent channel and the water delivery device configured to remove oil from the influent water to produce a cleansed water for routing to the water delivery device,
    wherein the water removal and delivery devices complementary operate to urge the flow of surface water, within the confines of the curtain, toward the water removal device and thence to the water restoration system.

8. The system of claim 7, wherein the water restoration system includes a diverter valve interposed between the aerator and the water delivery device, the diverter valve connected with a channel in hydraulic communication with the boat slip.

9. The system of claim 8, wherein the diverter valve delivers the cleansed water through the channel to the boat slip or to the boat slip via the water delivery device.

* * * * *